United States Patent
Park et al.

(10) Patent No.: US 9,896,346 B2
(45) Date of Patent: Feb. 20, 2018

(54) SYNTHESIS METHOD OF LITHIUM-TITANIUM OXIDE USING SOLID-STATE METHOD

(71) Applicant: KOREA BASIC SCIENCE INSTITUTE, Daejeon (KR)

(72) Inventors: Yi-Hyun Park, Daejeon (KR); Seungyon Cho, Daejeon (KR); Mu-Young Ahn, Daejeon (KR); Kyung-Mi Min, Incheon (KR)

(73) Assignee: KOREA BASIC SCIENCE INSTITUTE, Daejeon (KR)

( * ) Notice: Subject to any disclaimer, the term of this patent is extended or adjusted under 35 U.S.C. 154(b) by 75 days.

(21) Appl. No.: 15/079,837

(22) Filed: Mar. 24, 2016

(65) Prior Publication Data
US 2016/0304355 A1  Oct. 20, 2016

(30) Foreign Application Priority Data

Apr. 14, 2015  (KR) .................. 10-2015-0052214

(51) Int. Cl.
*C01G 23/00* (2006.01)
*G21B 1/13* (2006.01)

(52) U.S. Cl.
CPC ............. *C01G 23/005* (2013.01); *G21B 1/13* (2013.01); *C01P 2002/72* (2013.01); *C01P 2004/03* (2013.01); *Y02E 30/128* (2013.01)

(58) Field of Classification Search
CPC ....... C01G 23/005; G21B 1/13; Y02E 30/128; C01P 2002/72; C01P 2004/03
See application file for complete search history.

(56) References Cited

U.S. PATENT DOCUMENTS

| | | | | |
|---|---|---|---|---|
| 5,545,468 A * | 8/1996 | Koshiba | ................ | H01M 4/485 429/231.1 |
| 6,645,673 B2 * | 11/2003 | Yamawaki | ........... | C01G 23/005 423/598 |
| 2001/0031401 A1 * | 10/2001 | Yamawaki | ........... | C01G 23/005 429/231.1 |
| 2004/0202934 A1 * | 10/2004 | Zaghib | ................... | B82Y 30/00 429/231.1 |
| 2014/0038058 A1 * | 2/2014 | Holzapfel | ............ | C01G 23/005 429/319 |
| 2015/0236345 A1 * | 8/2015 | Demopoulos | ......... | H01M 4/485 429/231.5 |

FOREIGN PATENT DOCUMENTS

| | | |
|---|---|---|
| JP | 2001-213622 | 8/2001 |
| WO | WO 2014/056111 | 4/2014 |

* cited by examiner

*Primary Examiner* — Anthony J Zimmer
(74) *Attorney, Agent, or Firm* — Norton Rose Fulbright US LLP

(57) ABSTRACT

A method for synthesizing lithium-titanium oxide using a solid state method includes: mixing lithium oxide ($Li_2O$) and titanium oxide ($TiO_2$) in a solvent; separating a solid material which includes lithium oxide and titanium oxide from the solvent; drying the solid material separated from the solvent; and performing a heat treatment on the solid material.

10 Claims, 4 Drawing Sheets

SYNTHESIS METHOD OF LITHIUM-TITANIUM OXIDE USING SOLID-STATE METHOD

CROSS-REFERENCE TO RELATED APPLICATION

This application claims priority to and the benefit of Korean Patent Application No. 10-2015-0052214, filed on Apr. 14, 2015, the disclosure of which is incorporated herein by reference in its entirety.

BACKGROUND

1. Field of the Invention

The present invention relates to a method for synthesizing lithium-titanium oxide using a solid state method, and more specifically to a method for synthesizing lithium-titanium oxide, which is used for a breeding material in a nuclear fusion reaction and represented by $Li_2TiO_3$, using a solid state method.

2. Discussion of Related Art

Among deuterium and tritium which are used as fuels of a nuclear fusion reactor, tritium is generated by a reaction of neutrons and lithium because it is not present in nature. A material generating tritium is referred to as a breeding material, and a breeding material including lithium in a solid state is referred to as a solid breeding material.

Representative examples of the solid breeding material include lithium oxide ($Li_2O$), lithium-aluminum oxide ($Li_2AlO_2$), lithium-zirconium oxide ($Li_2ZrO_3$), lithium-titanium oxide ($Li_2TiO_3$), lithium-silicon oxide ($Li_4SiO_4$), etc.

Especially, among these solid ceramic breeding materials, lithium-titanium oxide ($Li_2TiO_3$) is now known to have advantages in that it has high stability at a high temperature and is capable of generating tritium at a low temperature.

However, lithium-titanium oxide which has been commercialized is expensive, and includes impurities such as cobalt which is a long-period element, and thus is disadvantageous in that it is difficult to be reused as a breeding material. Further, when lithium-titanium oxide is formed by a solid state synthesis method, it is difficult to control the reduction of a particle size for ensuring the ease of tritium emission.

SUMMARY OF THE INVENTION

The present invention has been made to solve the aforementioned problems, and an object of the present invention is to provide a method for synthesizing lithium-titanium oxide, which may be prepared to have fine particles, and used as a recyclable breeding material, using a solid state method.

Provided is a method for synthesizing lithium-titanium oxide using a solid state method according to an example of the present invention. The synthesis method includes: mixing lithium oxide ($Li_2O$) and titanium oxide ($TiO_2$) in a solvent; separating a solid material which includes lithium oxide and titanium oxide from the solvent; drying the solid material separated from the solvent; and performing a heat treatment on the solid material.

A molar ratio of lithium oxide to titanium oxide may be 1:0.940 or more to less than 1:1.

A molar ratio of lithium oxide to titanium oxide may be in the range of 1:0.940 to 1:0.944.

Titanium oxide may have an anatase crystal structure.

A molar ratio of lithium oxide to titanium oxide may be 1:0.942 when titanium oxide has a rutile crystal structure.

The heat treatment may be performed at 600° C. or more to less than 800° C.

The heat treatment may be performed at 670° C. or more to less than 800° C.

The heat treatment may be performed for 12 hours or more.

Titanium oxide may have an anatase crystal structure.

Lithium-titanium oxide prepared in the performing of the heat treatment may have a $Li_2TiO_3$ structure.

The solvent may include an alcohol.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention.

Hereinafter, the present invention will be described in detail in conjunction with the appended drawings.

Figure 1:
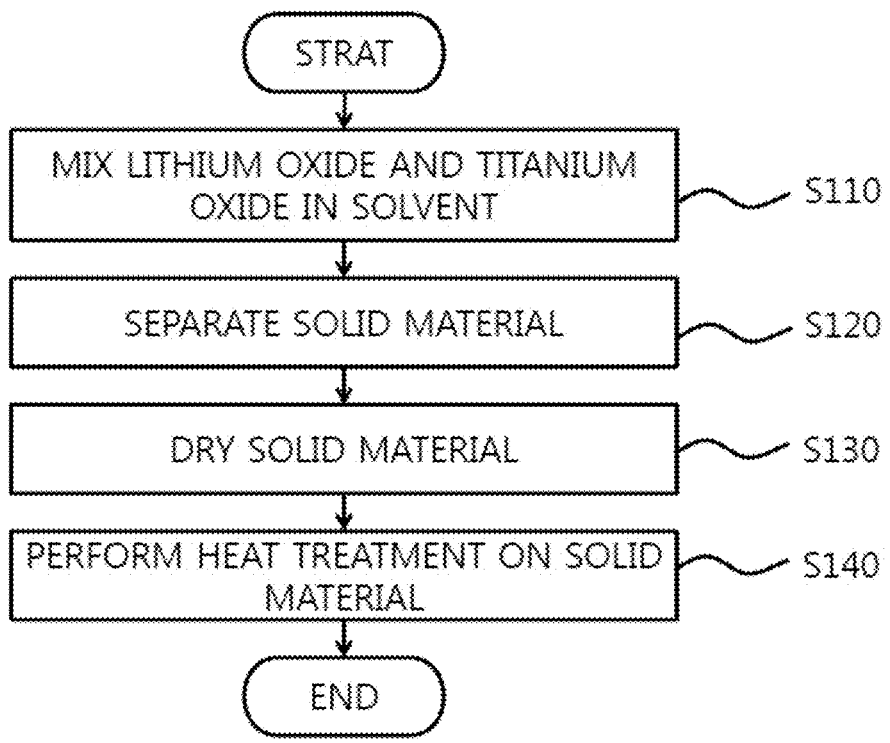
FIG. 1 is a flow chart for illustrating a method for synthesizing lithium-titanium oxide according to an example of the present invention.

FIG. 1 is a flow chart for illustrating a method for synthesizing lithium-titanium oxide according to an example of the present invention.

Referring to FIG. 1, first, lithium oxide ($Li_2O$) and titanium oxide ($TiO_2$) are mixed in a solvent to prepare lithium-titanium oxide according to the present invention (S110). Here, mixing may be performed such that the molar ratio of lithium oxide to titanium oxide is 1:0.940 or more to less than 1:1.

A mixing process is performed by a wet process using a solvent. Lithium oxide and titanium oxide may be wet-milled in the mixing process. The mixing process may be performed by ball-milling. The solvent used in the mixing process may include an alcohol. For example, lithium oxide and titanium oxide may be mixed in isopropyl alcohol (IPA). Here, the mixing process may be performed for 4 to 5 hours.

When the molar ratio of lithium oxide to titanium oxide is less than 1:0.940 or 1:1 or more, compounds such as $LiTiO_2$, $TiO_2$ or the like are included as impurities in a final product in addition to lithium-titanium oxide having a $Li_2TiO_3$ structure. When these impurities are contained, the final product may not be used as a breeding material because the purity is reduced, and thus the molar ratio of lithium oxide to titanium oxide is preferably 1:0.940 to 1:1. More preferably, the molar ratio of lithium oxide to titanium oxide may be in the range of 1:0.940 to 1:0.944. Most preferably, the molar ratio of lithium oxide to titanium oxide may be 1:0.942.

Any titanium oxide having a rutile structure or an anatase structure may be used as titanium oxide. However, titanium oxide having an anatase crystal structure is more suitable for preparing lithium-titanium oxide which is controlled to have a fine particle size as a breeding material.

When titanium oxide having a rutile crystal structure is used as titanium oxide, highly crystalline lithium-titanium oxide without impurities may be prepared when the molar ratio of lithium oxide and titanium oxide is 1:0.942.

A solid material is separated from a solvent in a mixed solution of lithium oxide and titanium oxide (S120), and then the solid material separated from the solvent is dried (S130).

The mixed solution includes a liquid material and a solid material, and the solid material may be obtained by separation from the liquid material. The liquid material in the mixed solution is a solvent used in the mixing process, and the solid material includes lithium oxide and titanium oxide.

In an example, the solid material may be separated from the mixed solution by centrifugation. After the solid material is separated, the solvent remaining in the solid material is removed by a drying process. Here, the drying process may be performed in a vacuum, and may be performed at 50 to 70° C. for 5 to 7 hours.

Thereafter, a heat treatment is performed on the obtained solid material (S140) to prepare lithium-titanium oxide according to the present invention.

Lithium oxide reacts with titanium oxide in the solid material by a heat treatment process, and thereby lithium-titanium oxide having a $Li_2TiO_3$ crystal structure is prepared.

The heat treatment process may be performed at 600 to 800° C. When the heat treatment process is performed at less than 600° C., lithium-titanium oxide with high purity is difficult to be obtained because lithium-titanium oxide as a final product includes impurities. Further, when the heat treatment process is performed at 800° C. or more, lithium-titanium oxide having a $Li_4Ti_5O_{12}$ crystal structure in addition to a $Li_2TiO_3$ crystal structure is generated, and thus availability as a breeding material may be reduced. Accordingly, the heat treatment process may be performed at 600° C. or more to less than 800° C., preferably, at 670° C. or more to less than 800° C., and most preferably, at 700° C.

The heat treatment process may be performed in an air atmosphere after pouring a solid material into a quartz crucible and putting it into a box oven. Here, the heat treatment process may be performed for 2 to 24 hours.

As described above, in lithium-titanium oxide according to the present invention, lithium oxide and titanium oxide are reacted by a solid state method such that lithium-titanium oxide which is a final product may be easily controlled to have a fine particle size, and lithium-titanium oxide having a uniform particle size may be prepared. Moreover, spherical lithium-titanium oxide may be easily prepared according to the preparation method of the present invention.

Hereinafter, the present invention will be described in detail in conjunction with examples in which lithium-titanium oxide is prepared according to the preparation method of the present invention.

Preparation of Samples LTA-0 to LTA-5 and Comparative Sample CLTA-1

Lithium oxide ($Li_2O$) and titanium oxide ($TiO_2$) having an anatase crystal structure were mixed in the molar ratio of 1:0.940, and ball-milled in 100 mL of isopropyl alcohol (IPA) at a rate of 300 rpm for 3 hours. Subsequently, a solid material was separated using a centrifuge, was vacuum-dried at 60° C. for 6 hours, and a heat treatment was performed thereon at 700° C. for 12 hours to prepare lithium-titanium oxide (sample LTA-0) according to Example LTA-0 of the present invention.

Samples LTA-1 to LTA-5 and comparative sample CLTA-1 were prepared in substantially the same manner as sample LTA-0 by controlling molar ratio conditions as shown in the following Table 1.

TABLE 1

| Classification | Molar ratio of lithium oxide to titanium oxide | Heat treatment temperature (unit: ° c.) | Heat treatment time (unit: hours) |
|---|---|---|---|
| LTA-0 | 1:0.940 | 700 | 12 |
| LTA-1 | 1:0.941 | | |
| LTA-2 | 1:0.942 | | |
| LTA-3 | 1:0.943 | | |
| LTA-4 | 1:0.944 | | |
| LTA-5 | 1:0.945 | | |
| CLTA-1 | 1:0.938 | | |

Analysis of Samples LTA-0 to LTA-5 and Comparative Sample CLTA-1

A diffraction angle (2θ) with respect to a CuK-alpha characteristic X-ray wavelength was measured through XRD (x-ray diffraction) analysis for each of samples LTA-0 to LTA-5 and comparative sample CLTA-1. The results were shown in FIGS. 2 and 3.

Figure 2:
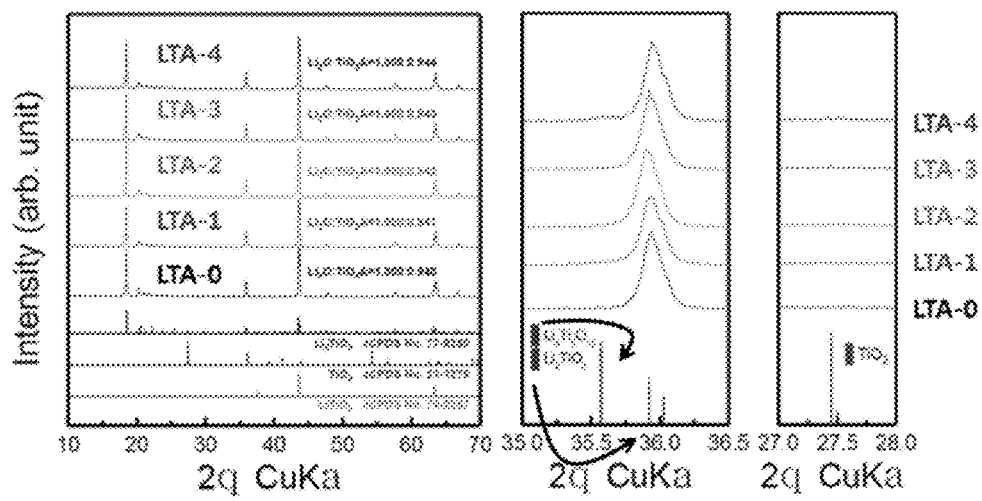
FIG. 2 is an XRD graph of samples LTA-0 to LTA-4.
Figure 3:
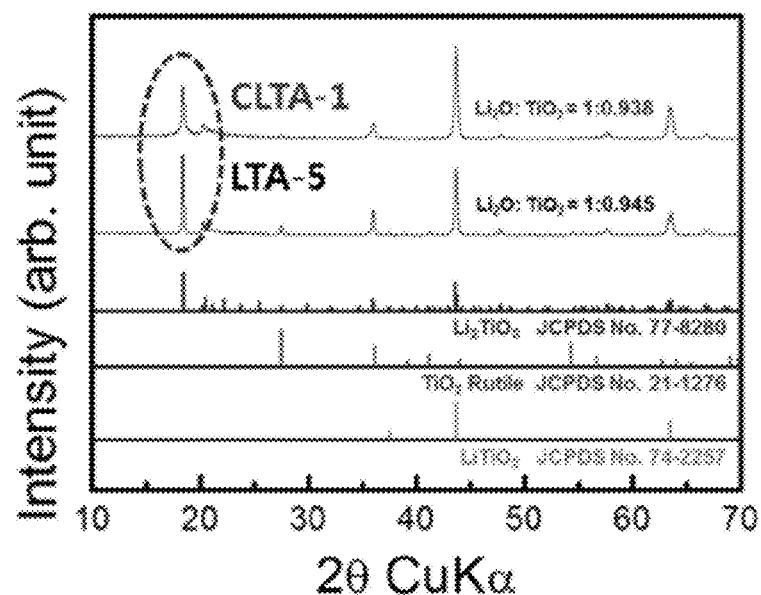
FIG. 3 is an XRD graph of sample LTA-5 and comparative sample CLTA-1.

FIG. 2 is an XRD graph of samples LTA-0 to LTA-4, and FIG. 3 is an XRD graph of sample LTA-5 and comparative sample CLTA-1.

An x-axis represents a diffraction angle (2θ, unit: degrees) and a y-axis represents intensity (unit: arbitrary unit) in each of FIGS. 2 and 3. Peaks of $LiTiO_2$ (JCPDS No. 74-2257), $TiO_2$ (JCPDS No. 21-1276) and $Li_2TiO_3$ (JCPDSNo. 77-8280) are illustrated together as a reference for peaks in the XRD graph in FIGS. 2 and 3.

Referring to FIG. 2, each of samples LTA-0 to LTA-4 has a main peak corresponding to that of $Li_2TiO_3$ at a diffraction angle (2θ) in the range of 5 to 20 degrees. Especially, it may be determined that the main peak of each of samples LTA-0 to LTA-4 results from $Li_2TiO_3$, and not from $Li_4Ti_5O_{12}$. That is, it may be known that highly crystalline $Li_2TiO_3$ was prepared. Furthermore, each of samples LTA-0 to LTA-4 may be determined to have no main peak corresponding to that of $TiO_2$.

Referring to FIG. 3, it may be determined that sample LTA-5 shows substantially the same result as those of samples LTA-0 to LTA-4, and comparative sample CLTA-1 in which the molar ratio of lithium oxide and titanium oxide is 1:0.938 has a main peak resulting from $Li_2TiO_3$, but the intensity thereof is close to almost 50% of that of sample LTA-5.

That is, it may be determined that, since low crystalline $Li_2TiO_3$ is prepared when the molar ratio of lithium oxide and titanium oxide is 1:0.938 under the same heat treatment temperature and time conditions, lithium-titanium oxide which is suitable as a breeding material may be prepared when the molar ratio is at least more than 1:0.938, and specifically is 1:0.940.

According to the description of FIGS. 2 and 3, it may be experimentally determined that lithium-titanium oxide with high availability as a breeding material may be prepared only if the molar ratio of lithium oxide and titanium oxide is at least 1:0.940. Especially, it may be determined that highly crystalline $Li_2TiO_3$ may be prepared when the molar ratio is in the range of 1:0.940 to 1:0.944.

Preparation of Samples LTA-5 to LTA-9

Lithium oxide ($Li_2O$) and titanium oxide ($TiO_2$) were mixed in the molar ratio of 1:0.942, and ball-milled in 100 mL of isopropyl alcohol (IPA) at a rate of 300 rpm for 3 hours. Subsequently, a solid material was separated using a centrifuge, was vacuum-dried at 60° C. for 6 hours, and the dried material was ground in an agate mortar and prepared in powder form. A heat treatment was performed on the powder at 650° C. for 2 hours to prepare lithium-titanium oxide (sample LTA-6) according to Example LTA-6 of the present invention.

Samples LTA-7 to LTA-10 were prepared in substantially the same manner as sample LTA-6 by controlling heat treatment temperature conditions as shown in the following Table 2.

TABLE 2

| Classification | Molar ratio of lithium oxide to titanium oxide | Heat treatment temperature (unit: ° c.) | Heat treatment time (unit: hours) |
|---|---|---|---|
| LTA-6 | 1:0.942 | 650 | 24 |
| LTA-7 | | 660 | |
| LTA-8 | | 670 | |
| LTA-9 | | 680 | |
| LTA-10 | | 700 | |

Analysis of Samples LTA-6 to LTA-10

A diffraction angle (2θ) with respect to a CuK-alpha characteristic X-ray wavelength was measured through XRD analysis for each of samples LTA-6 to LTA-10. The results were shown in FIG. 4.

Figure 4:
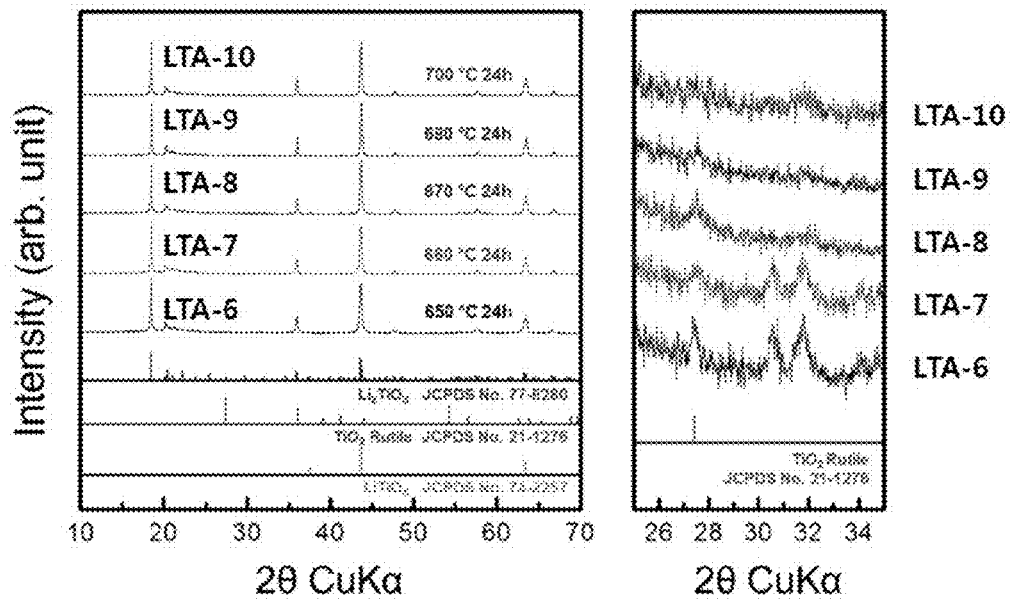
FIG. 4 is an XRD graph of samples LTA-6 to LTA-10.

FIG. 4 is an XRD graph of samples LTA-6 to LTA-10.

In FIG. 4, an x-axis represents a diffraction angle (2θ, unit: degrees) and a y-axis represents intensity (unit: arbitrary unit). Peaks of $TiO_2$ Rutile (JCPDS No. 21-1276), $LiTiO_2$ (JCPDS No. 74-2257) and $Li_2TiO_3$ (JCPDS No. 77-8280) are illustrated together as a reference for peaks in the XRD graph in FIG. 4.

Referring to FIG. 4, each of samples LTA-6 to LTA-10 has a main peak corresponding to that of $Li_2TiO_3$ at a diffraction angle (2θ) in the range of 5 to 20 degrees. Further, it may be determined that each of samples LTA-6 to LTA-10 has a main peak corresponding to that of $TiO_2$ at a diffraction angle (2θ) in the range of 25 to 30 degrees.

It may be determined that the intensity of the main peak of $TiO_2$ is reduced while a heat treatment temperature increases from 650 to 700° C., under the same molar ratio and heat treatment time conditions. That is, the intensity of the main peak of $TiO_2$ at each of 650° C., 660° C., 670° C. and 680° C. has decreased, and no peak is substantially shown at 670 to 700° C.

As may be seen from FIG. 4, a heat treatment is preferably performed at 650 to 700° C., more preferably at 670° C. or more to less than 800° C., and most preferably at 700° C. to obtain highly crystalline $Li_2TiO_3$.

Preparation of Samples LTA-11 and LTA-12

Lithium oxide ($Li_2O$) and titanium oxide ($TiO_2$) were mixed in the molar ratio of 1:0.942, and ball-milled in 100 mL of isopropyl alcohol (IPA) at a rate of 300 rpm for 3 hours. Subsequently, a solid material was separated using a centrifuge, was vacuum-dried at 60° C. for 6 hours, and the dried material was ground in an agate mortar and prepared in powder form. A heat treatment was performed on powders at 700° C. for 2 hours to prepare lithium-titanium oxide (sample LTA-11) according to Example LTA-11 of the present invention.

Samples LTA-11 and 12 were prepared by a controlling heat treatment times as shown in the following Table 3.

TABLE 3

| Classification | Molar ratio of lithium oxide to titanium oxide | Heat treatment temperature (unit: ° c.) | Heat treatment time (unit: hours) |
|---|---|---|---|
| LTA-11 | 1:0.942 | 700 | 2 |
| LTA-12 | | | 6 |
| LTA-2 | | | 12 |
| LTA-10 | | | 24 |

Comparison and Analysis of Samples LTA-11 and LTA-12 and Samples LTA-2 and LTA-10

A diffraction angle (2θ) with respect to a CuK-alpha characteristic X-ray wavelength was measured through XRD analysis for each of samples LTA-2 and LTA-9 to LTA-11. The results were shown in FIG. 5.

Figure 5:
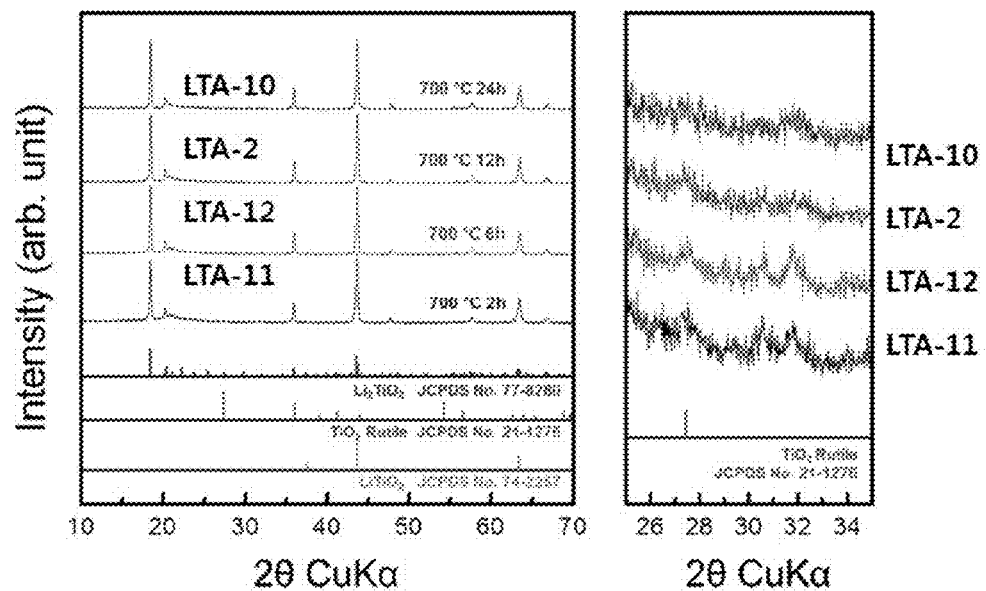
FIG. 5 is an XRD graph of samples LTA-2 and LTA-10 to LTA-12.

Peaks of $TiO_2$ Rutile (JCPDS No. 21-1276), $Li_2TiO_3$ (JCPDS No. 77-8280) and $LiTiO_2$ (JCPDS No. 74-2257) are illustrated together as a reference for peaks in the XRD graph in FIG. 5.

FIG. 5 is an XRD graph of samples LTA-2 and LTA-10 to LTA-12.

Referring to FIG. 5, it may be determined that lithium-titanium oxide having a more pure $Li_2TiO_3$ structure may be prepared in the case in which the heat treatment time is 12 to 24 hours (samples LTA-2 and LTA-10) as compared to the case in which the heat treatment time is 2 to 6 hours (samples LTA-11 and LTA-12), under the same heat treatment temperature conditions. Accordingly, the heat treatment is preferably performed for 12 hours or more, and especially, for about 24 hours.

Preparation of Sample LTR-1

Sample LTR-1 was prepared in substantially the same manner as sample LTA-2 except that $TiO_2$ having a rutile structure was used instead of $TiO_2$ having an anatase structure.

Comparison and Analysis of Sample LTA-2 and Sample LTR-1

A diffraction angle (2θ) with respect to a CuK-alpha characteristic X-ray wavelength was measured through XRD analysis for each of sample LTA-2 and sample LTA-1. Further, a scanning electron microscopy (SEM) image of each of sample LTA-2 and sample LTA-1 was taken. The results were respectively shown in FIGS. 6 and 7.

Figure 6:
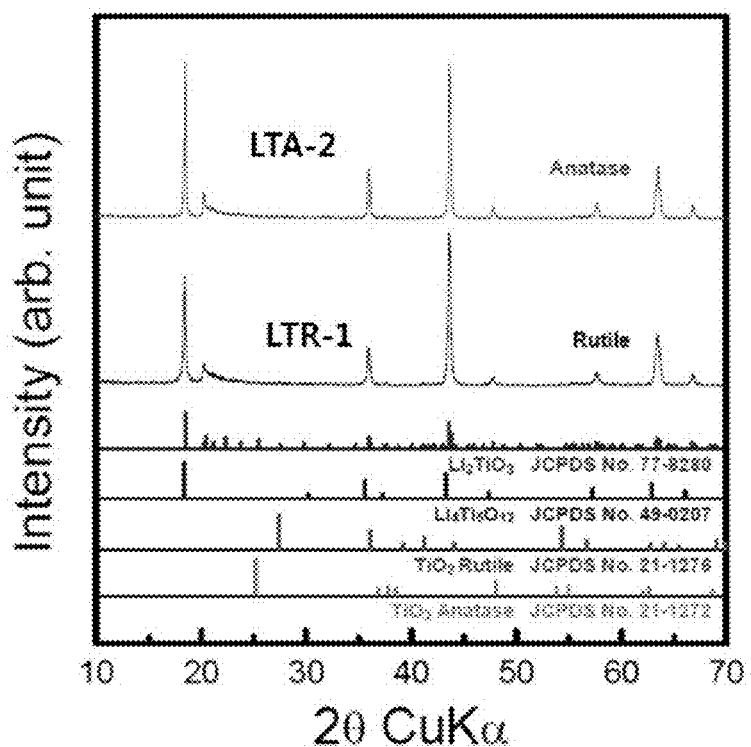
FIG. 6 is an XRD graph of samples LTA-2 and LTR-1.

Peaks of $Li_4Ti_5O_{12}$ (JCPDS No. 49-0207), $TiO_2$ Rutile (JCPDS No. 21-1276), $TiO_2$ Anatase (JCPDS No. 21-1272) and $Li_2TiO_3$ (JCPDS No. 77-8280) are illustrated together as a reference for peaks in the XRD graph in FIG. 6.

FIG. 6 is an XRD graph of samples LTA-2 and LTR-1.

Referring to FIG. 6, it may be determined that both of samples LTR-1 and LTA-2 have main peaks corresponding to that of $Li_2TiO_3$. That is, it may be determined that highly crystalline $Li_2TiO_3$ may be prepared in both of the case in which when $TiO_2$ with a rutile structure is used and the case in which $TiO_2$ with an anatase structure is used.

Figure 7:
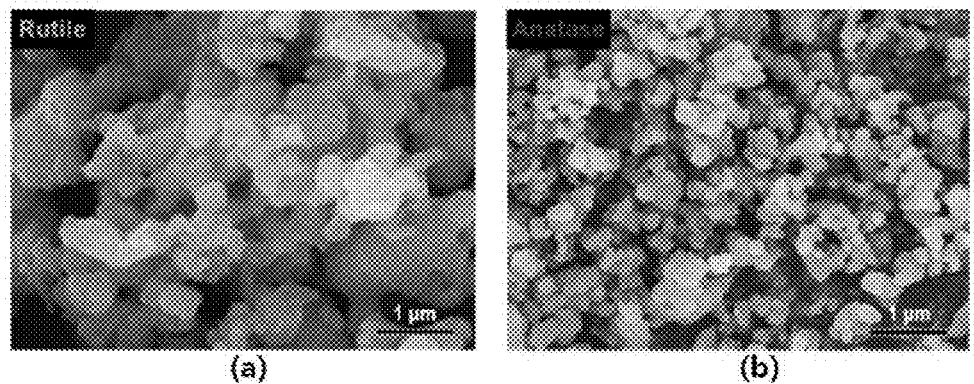
FIG. 7 shows SEM images of samples LTR-1 and LTA-2.

SEM images of FIG. 7 are SEM images in which the scale bar is 1 μm, FIG. 7(a) is an image of sample LTR-1, and FIG.

7(b) is an image of sample LTA-2. Referring to FIG. 7, it may be determined from both of samples LTR-1 and LTA-3 that spherical lithium-titanium oxide having a uniform particle size was formed. However, it was determined that lithium-titanium oxide having a smaller particle size was formed in the case of sample LTA-2 in which $TiO_2$ having an anatase structure was used as compared to the case of sample LTR-1 in which $TiO_2$ having a rutile structure was used.

Analysis of Components of Commercially Available Product and Samples LTA-2 and LTR-1

Lithium-titanium oxide in powder form manufactured by Japan Pure Chemical Co., Ltd., and sample LTA-2 and sample LTR-1 prepared according to the present invention were prepared. Analysis of components of each sample was performed according to an inductively coupled plasma method. The results were shown in Table 4.

TABLE 4

| Type of element | Product manufactured by Japan Pure Chemical Co., Ltd. | LTA-2 | LTR-1 |
| --- | --- | --- | --- |
| Al | 5.49 ppm | 33.18 ppm | 30.89 ppm |
| Co | 629.11 ppm | — | — |
| Ca | 70.07 ppm | 47.08 ppm | 82.16 ppm |
| Cr | 34.57 ppm | 2.99 | 0.731 ppm |
| Fe | 6.54 ppm | — | — |
| Mg | 20.92 ppm | 12.88 | 68.83 ppm |
| B | — | 0.299 | 0.062 ppm |
| Na | 144.40 ppm | 60.97 ppm | 33.43 ppm |
| Zr | — | 339.6 ppm | 3139 ppm |

Referring to Table 4, it may be determined that the commercially available product contains a large amount of cobalt which is a long-period element while no cobalt was detected in samples LTA-2 and LTR-1 prepared according to an example of the present invention, and although each of samples LTA-2 and LTR-1 includes aluminum, an amount of aluminum is in an acceptable range. That is, lithium-titanium oxide prepared according to the present invention may be easily reused.

Preparation of Samples LTR-2 to LTR-4

Samples LTR-2 to LTR-4 were prepared in substantially the same manner as sample LTR-1 except for the molar ratio of lithium oxide to titanium oxide having a rutile structure. Each sample was prepared according to Table 5.

TABLE 5

| Classification | Molar ratio of lithium oxide to titanium oxide | Heat treatment temperature (unit: ° c.) | Heat treatment time (unit: hours) |
| --- | --- | --- | --- |
| LTR-1 | 1:0.942 | 700 | 12 |
| LTR-2 | 1:0.945 | | |
| LTR-3 | 1:0.943 | | |
| LTR-4 | 1:0.938 | | |

Comparison and Analysis of Samples LTR-1 to LTR-4

A diffraction angle (2θ) with respect to a CuK-alpha characteristic X-ray wavelength was measured through XRD analysis for each of samples LTR-1 to LTR-4. Each result was shown in FIG. 8.

Figure 8:
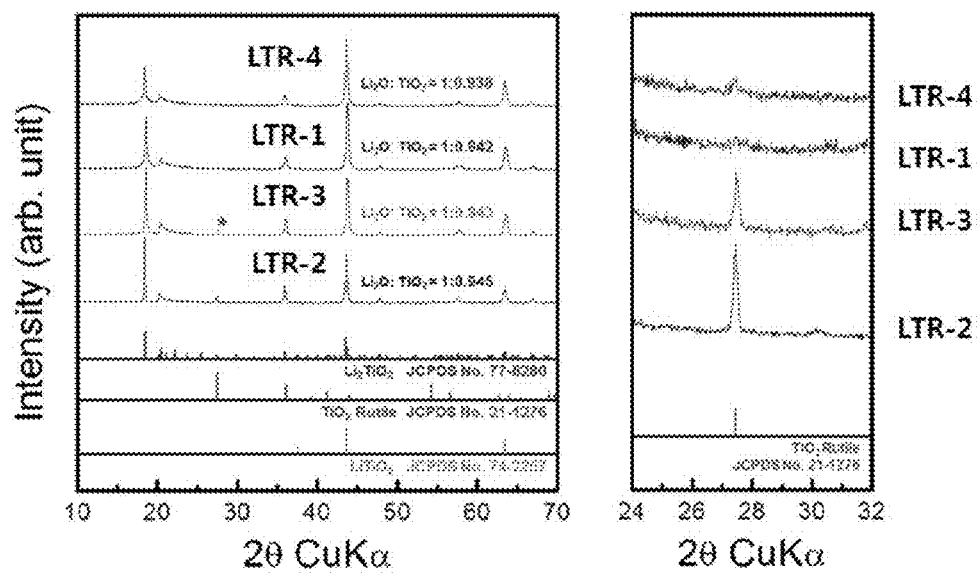
FIG. 8 is an XRD graph of samples LTR-1 to LTR-4.

Peaks of $TiO_2$ Rutile (JCPDS No. 21-1276), $LiTiO_2$ (JCPDS No. 74-2257) and $Li_2TiO_3$ (JCPDS No. 77-8280) are illustrated together as a reference for peaks in the XRD graph in FIG. 8.

FIG. 8 is an XRD graph of samples LTR-1 to LTR-4.

Referring to FIG. 8, it may be determined that the intensity of the main peak of $Li_2TiO_3$ is low when the molar ratio is less than 1:0.940 like sample LTR-4 while titanium oxide having a rutile structure is used as a starting material, under the same heat treatment temperature and time conditions. That is, the reaction is preferably performed with lithium oxide and titanium oxide in the molar ratio of at least 1:0.940 or more.

However, since samples LTR-2 to LTR-4 have main peaks resulting from $TiO_2$, it may be determined that the molar ratio of lithium oxide to titanium oxide is most preferably 1:0.942 like sample LTR-1 when titanium oxide having a rutile structure is used to prepare lithium-titanium oxide with high purity and high crystallinity.

The description of the presented embodiments is provided so that those skilled in the art of the present invention use or implement the present invention. It will be apparent to those skilled in the art that various modifications of the embodiments will be apparent to those skilled in the art and general principles defined herein can be applied to other embodiments without departing from the scope of the present invention. Therefore, the present invention is not limited to the embodiments presented herein, but should be analyzed within the widest range which is associated with the principles and new features presented herein.

According to a method for synthesizing lithium-titanium oxide using a solid state method of the present invention, lithium-titanium oxide ($Li_2TiO_3$) which can be controlled for grain refining to ensure the ease of tritium emission may be realized and used as a recyclable breeding material can be prepared.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A method for synthesizing a lithium-titanium oxide using a solid state method, comprising:
   mixing lithium oxide ($Li_2O$) and titanium oxide ($TiO_2$) in a solvent;
   separating a solid material which includes lithium oxide and titanium oxide from the solvent;
   drying the solid material separated from the solvent; and
   performing a heat treatment on the solid material,
   wherein a molar ratio of lithium oxide to titanium oxide is 1:0.940 or more to less than 1:1.

2. The method of claim 1, wherein a molar ratio of lithium oxide to titanium oxide is in the range of 1:0.940 to 1:0.944.

3. The method of claim 2, wherein the titanium oxide has an anatase crystal structure.

4. The method of claim 1, wherein titanium oxide has a rutile crystal structure and a molar ratio of lithium oxide to titanium oxide is 1:0.942.

5. The method of claim 1, wherein the heat treatment is performed at 600° C. or more to less than 800° C.

6. The method of claim 1, wherein the heat treatment is performed at 670° C. or more to less than 800° C.

7. The method of claim 1, wherein the heat treatment is performed for 12 hours or more.

8. The method of claim 1, wherein the titanium oxide has an anatase crystal structure.

9. The method of claim 1, wherein lithium-titanium oxide prepared in the performing of the heat treatment has a $Li_2TiO_3$ structure.

10. The method of claim 1, wherein the solvent includes an alcohol.

\* \* \* \* \*